United States Patent
Heer

(10) Patent No.: US 7,401,624 B2
(45) Date of Patent: Jul. 22, 2008

(54) METHOD FOR MONITORING A PIPELINE AND POSITION REGULATOR FOR A CONTROL VALVE

(75) Inventor: Klaus-Peter Heer, Herxheim (DE)

(73) Assignee: Siemens Aktiengesellschaft, Munich (DE)

(*) Notice: Subject to any disclaimer, the term of this patent is extended or adjusted under 35 U.S.C. 154(b) by 550 days.

(21) Appl. No.: 10/538,415

(22) PCT Filed: Dec. 11, 2003

(86) PCT No.: PCT/DE03/04096

§ 371 (c)(1),
(2), (4) Date: Jun. 10, 2005

(87) PCT Pub. No.: WO2004/053371

PCT Pub. Date: Jun. 24, 2004

(65) Prior Publication Data

US 2006/0042699 A1    Mar. 2, 2006

(30) Foreign Application Priority Data

Dec. 11, 2002 (DE) .............................. 102 57 910

(51) Int. Cl.
*F16K 37/00* (2006.01)
(52) U.S. Cl. .................. 137/554; 137/1; 137/487.5; 251/129.04; 73/168
(58) Field of Classification Search .............. 137/1, 137/487.5, 551, 552, 554; 251/129.04; 73/168; 700/282
See application file for complete search history.

(56) References Cited

U.S. PATENT DOCUMENTS

| | | | | |
|---|---|---|---|---|
| 4,007,754 A | * | 2/1977 | Beck et al. | 137/487.5 |
| 4,709,728 A | * | 12/1987 | Ying-Chung | 251/129.04 |
| 4,896,101 A | * | 1/1990 | Cobb | 73/168 |
| 4,948,090 A | * | 8/1990 | Chen | 251/129.04 |
| 5,251,148 A | * | 10/1993 | Haines et al. | 700/282 |
| 5,616,829 A | * | 4/1997 | Balaschak et al. | 73/46 |
| 5,748,469 A | | 5/1998 | Pyötsiä | |
| 6,530,277 B2 | * | 3/2003 | Kumpfmueller | 73/168 |
| 6,637,267 B2 | * | 10/2003 | Fiebelkorn et al. | 73/592 |
| 6,976,503 B2 | * | 12/2005 | Ens et al. | 73/168 |
| 7,203,575 B2 | * | 4/2007 | Maturana et al. | 700/282 |
| 2003/0019297 A1 | | 1/2003 | Fiebelkorn et al. | |
| 2008/0053204 A1 | * | 3/2008 | Neville et al. | 73/61.71 |

FOREIGN PATENT DOCUMENTS

| | | |
|---|---|---|
| DE | 38 44 960 C2 | 2/1990 |
| DE | 43 42 554 A1 | 6/1995 |
| DE | 199 47 129 A1 | 4/2001 |
| EP | 0 708 389 A1 | 4/1996 |

* cited by examiner

*Primary Examiner*—John Rivell

(57) ABSTRACT

The invention relates to a method for monitoring a pipeline in order to detect the slow reduction of the free inner cross-section by means of the position of a control valve in the pipeline. When the flow rate is essentially constant, a first position is determined and stored at a first moment. According to at least one second position of the control valve, determined at a second, subsequent moment, the point at which the position of the valve exceeds a pre-deterrninable threshold value for a valve opening is determined, and optionally a signal is emitted to indicate that the threshold value has been exceeded and/or the time at which it was exceeded. As a result, suitable maintenance measures can be introduced, before faults occur in the process system.

20 Claims, 1 Drawing Sheet

METHOD FOR MONITORING A PIPELINE AND POSITION REGULATOR FOR A CONTROL VALVE

CROSS REFERENCE TO RELATED APPLICATIONS

This application is the US National Stage of International Application No. PCT/DE2003/004096, filed Dec. 11, 2003 and claims the benefit thereof. The International Application claims the benefits of German application No. 10257910.5 filed Dec. 11, 2002, both applications are incorporated by reference herein in their entirety.

FIELD OF THE INVENTION

The invention relates to a method for monitoring a pipeline to detect a slow reduction in the free internal cross section with the aid of the position of a control valve in the pipeline, as well as to a position regulator for a control valve to execute the method.

BACKGROUND OF THE INVENTION

In many areas of process-control and energy technology the fault-free operation of a system depends on the pipelines, especially on their ability to let the relevant process medium pass through them. To avoid costly regular interruptions to operation it would be sensible to be able to detect well in advance whether a pipeline is blocked in process operation or whether the free internal cross section of the pipeline is slowly reducing. Such faults should where possible be detected right at the start, before a blockage of a pipeline can cause the plant to come to a halt. An operating fault could be avoided by a timely advance warning by optimizing maintenance processes and taking countermeasures in good time.

Previously plant operators were somewhat surprised to find that the flow though a pipeline had been suddenly blocked by a blockage. The mostly unexpected occurrence of a fault then causes production outages and the associated significant costs. One possibility of detecting a reduction in the free pipeline cross section well in advance is an endoscopic investigation of the pipeline, but this can only be done by interrupting the process and thus entails significant effort.

A method for monitoring exhaust gas transport systems with a control valve as control for a pressure-regulated exhaust emission is known from DE-PS 43 42 554. Based on the characteristic curve of the control valve at the exhaust outlet point, the pressure which would exist of the control valve were fully open is regulated as a function of the current volume stream and the regulated exhaust pressure. The maximum pressure loss occurring at maximum volume stream is determined with reference to the input pressure and the outlet pressure determined on the basis of the characteristic curve with a fully open control valve, presented as a function of time and compared with the maximum permitted pressure loss. When the value of the maximum pressure loss approaches the value of the maximum permitted pressure loss the time for cleaning the exhaust gas transport system is determined. The disadvantage of the method is that it is designed specifically for the requirements of an exhaust gas transport system and cannot simply be used as it is with other pipeline systems. In addition no account is taken of the fact that on determination of the exhaust gas pressure for a fully open control valve on the basis of its characteristic curve, because of the increased volume stream the loss of pressure over the pipeline increases additionally. The monitoring is thus comparatively imprecise.

A position regulator for a control valve with a position generator for recording the setting of the valve and with a device for evaluating the recorded position is known for example from DE 199 47 129 A1. This patent describes a system for diagnosis of the current valve status on the basis of a recorded sound signal. In particular a leakage in a closed valve is audibly detected.

SUMMARY OF THE INVENTION

The object of the invention is to find a method for monitoring a pipeline for slow reduction of the internal cross section which can be executed for a plurality of process control systems without any greater outlay as well as to create a position regulator for a control valve which is suitable for executing the method.

This object is achieved by the claims. The dependent claims describe advantageous further developments of the invention.

The advantage of the invention is that a pipeline can be monitored for slow blockage or accumulation solely using the means already available with control valves. Only the evaluation unit for the position value of the valve which is recorded by a position generator, which can be viewed as a component of the position regulator, has to be adapted in order to execute the method. Since such evaluation units are usually implemented by a processing unit with suitable software, this merely requires adaptation of the evaluation program to be processed by the processing unit in any event. The monitoring function can be easily deactivated if the requirements for monitoring are not available or not available at the time. Especially for an application of a control valve for checking for constant media flow through a pipeline an essentially constant throughflow of the medium for a major part of the operating time is required. By observing and evaluating the change of the lift position of the control valve over time a slow reduction of the free internal cross section of the pipeline is detected. If with an essentially constant throughflow of a medium the valve has to be opened further than a specifiable threshold, a signal to indicate the fact that the threshold has been exceeded is output. On the basis of this display signal suitable countermeasures can be taken at an early stage. For example the signal can be interpreted as an alerting signal for maintenance required, so that the pipeline can be cleaned or changed when maintenance is next performed on the process system. Operational faults or production outages can thus be avoided.

Preferably the first position of the control valve at the beginning of the operation of the process system, when the pipeline is still free of deposits, can be determined and stored. On regulation for constant throughflow this produces a degree of opening of the valve which can differ depending on the design of the plant.

Advantageously the method can be adapted to the relevant application by specifying the threshold value depending on the first position. The threshold value is set here in the range between full opening of the valve and the first position. The optimum position is again dependent on the relevant application, especially of the speed of depositing and the time intervals between the maintenance cycles. It has proved advantageous and suitable for many applications to output a display signal for a threshold value being exceeded, if the setting range remaining beyond the first setting to the opening of the valve is 80% used. This means that the signal is displayed at a point at which there is still a sufficiently safe interval before the onset of regulation problems, that is before regulation to a constant throughflow is no longer possible because the deposits in the pipeline are too large.

Since a long-term monotonously progressing deposit process is accompanied by a corresponding long-term monotonous shift in the position of the control valve, short duration peaks in the shift, which can be caused by pressure variations for example, can be suppressed by a lowpass filter, especially by forming a floating average, as regards their effect on the result of the diagnosis. This avoids a premature triggering of the pipeline monitoring and a premature output of a display signal for such fluctuations. Naturally other options can be applied for checking the plausibility of the relationship between the valve opening and material being deposited in the pipeline.

In addition or as an alternative to direct threshold comparison the change over time in the position of the control valve can be determined and the point in time estimated at which the position of the control valve is likely to exceed the specifiable threshold value. This has the advantage of allowing maintenance to be better planned, since not only the current blockage state of the pipeline, but also the speed of the reduction of the free internal cross section is taken into account.

To avoid a display signal being output prematurely for a threshold being exceeded It can be advantageous to determine the pressure of the medium in the pipeline and, if a permitted average value of the pressure is exceeded to interrupt the monitoring of the pipeline for blockage. The media pressure in the pipeline can for example be checked with a simple pressure switch at a feed point beyond a pump. Usually there are pressure converters in any event in process control systems, preferably at the ends of pipelines, for which the measured value can easily be included in the evaluation.

If however certain pressure changes are unavoidable and this could lead to an all too frequent interruption of monitoring, it is advantageous, to suppress the influences of pressure fluctuations on the position of the valve, to undertake pressure compensation which can be performed using a predetermined dependency of the valve position on the media pressure.

The invention, along with its embodiments and advantages is explained in greater detail below with reference to the drawings in which an exemplary embodiment of the invention is shown.

DETAILED DESCRIPTION OF THE INVENTION

Figure 1:
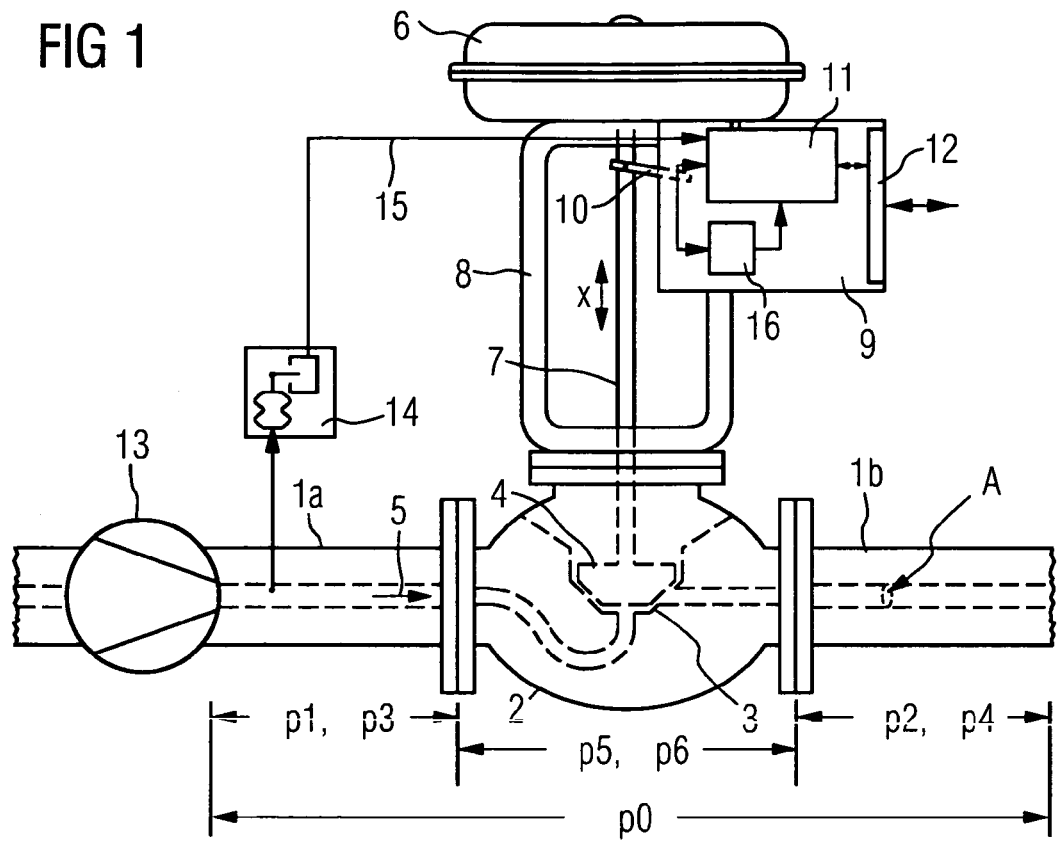
FIG. 1 a basic diagram of a control valve built into a pipeline.

In accordance with FIG. 1, a valve 2 is built into a pipeline 1 with pipeline sections 1a and 1b of a process control system not shown in any greater detail, which by a corresponding lift of a closure element 4 operating in conjunction with a valve seat 3, controls the throughflow of a medium 5. The lift is generated by a pneumatic drive 6 transmitted by means of a valve stem 7 to the closure element 4. The drive 6 is connected via a yoke 8 to the housing of the valve 2. A position regulator 9 is arranged on the yoke 8. The relevant position x of the valve is recorded by a position generator 10 and fed to an evaluation unit 11, which compares it with required value fed in via a data interface 12 from a field bus with digital or analog data transmission and on the output side controls the pneumatic drive 6 in the sense of controlling the regulation difference. The required value is prespecified by a controller not shown in the Figure so that an essentially constant throughflow of the medium 5 through the pipeline 1 and thus through the valve 2 is set. In the exemplary embodiment shown a pump 13 is additionally built into the pipeline 1 which creates the required flow pressure. A pressure switch 14 taps the media pressure obtaining in the flow direction beyond the pump 13 in the pipeline 1 and delivers a signal 15 to the evaluation unit 11, which indicates whether a permitted deviation from an average value of the pressure has been exceeded. So that smaller variations in the valve position, which could have a very wide variety of causes, do not lead directly to the pipeline monitoring system responding, the position signal is additionally generated for direct feeding to the evaluation unit 11 via a lowpass 16 on the evaluation unit 11. This lowpass filter, shown separately in the exemplary embodiment, which implements a floating average, can of course be implemented alternately by the evaluation unit 11 itself with suitable programming.

To explain the functional principle of the invention, in the area of the pipe section 1a, at the valve 2 and in the area of pipe section 1b, the pressure differences arising at a first point in time as the medium flows through the pipe $\Delta p1$, $\Delta p5$ or $\Delta p2$ and the pressure differences arising at a second, later point in time $\Delta p3$, $\Delta p6$ or $\Delta p0$ are plotted in FIG. 1. The pressure difference $\Delta p0$ designates the overall pressure difference which arises over the pipeline 1 with the two pipeline sections 1a and 1b as well as via the valve 2 by the flow of the medium at a constant speed of flow. The pipeline is monitored for slow reduction of a free internal cross section A by determination and evaluation of the change over time of the position x of the valve 2 recorded with the position generator 10, by the evaluation unit 11 of the position regulator 9 chronologically archiving and evaluating the floating average value of the valve position over time. If a specifiable threshold value is exceeded a warning message is output as a telegram via the field bus attached to the data interface 11 or a current or voltage signal is output to a control center. This signals an impending total blockage of the pipeline 1. The relationship between the blockage of the pipeline 1 and the position x of the valve 2 will be explained below:

In the operation of a process-control system the control valve regulates the flow through the pipeline 1 for a pressure difference $\Delta p0$ which is predetermined by the layout of the system and which is largely constant to a, mostly constant value, required by a process controller or control system. In this case the value of the pressure difference $\Delta p0$ at a first point in time, preferably when the system is commissioned and the pipeline is fully free of deposits, is equal to the sum of the pressure differences $\Delta p1$, $\Delta p5$ and $\Delta p2$. This means that:

$$\Delta p1 + \Delta p2 + \Delta p5 = \Delta p0.$$

In this case the pressure differences $\Delta p1$ and $\Delta p2$ are determined by the relevant flow resistance in the pipeline section 1a or 1b and the pressure difference $\Delta p5$ is determined by the flow resistance of the valve at the first point in time. The pressure difference $\Delta p5$ is dependent on the relevant setting of the valve 2 which is recorded by the position generator 10 and the throughflow that applies at the first point in time. If the valve 2 is used in the regulation circuit for controlling a specifiable, essentially constant, throughflow the valve setting is adjusted by the drive 6 such that the actual throughflow of the medium 5 through the pipeline 1 corresponds at least approximately to the predetermined value.

If deposits form over time on the inner walls of the pipeline sections 1a and 1b of the pipeline 1, flow resistance and pressure differences increase. For a pressure difference $\Delta p3$ or Δp0 applying at a second, later point in time in the pipeline sections 1a and 1b for the same throughflow value, the following thus applies:

$$\Delta p3+\Delta p4>\Delta p1+\Delta p2.$$

If the output of pump 13 remains the same and the process is also unchanged in other respects, the overall pressure difference Δp0 over the pipeline 1 and the valve 2 is essentially constant.

This means that a lower pressure difference Δp6 must be set by the valve 2 at the second point in time, in order to maintain the essentially constant flow of the medium 5 through the pipeline 1. The position x of the valve 2 is thus changed in the direction of an increase of the valve opening. The relevant position x of the valve 2, is, as already explained above, recorded by the position generator 10 and forwarded to the evaluation unit 11 both directly as well as via the lowpass 16. Storage of the floating average of the valve position undertaken by the evaluation unit 11, preferably at regular intervals, enables the tendency for a blockage of the pipeline to develop to be determined. If the valve position, which reflects the opening of the valve 2, exceeds a predetermined threshold value, a signal is output to indicate this value being exceeded via the interface 12 on the field bus. This can be interpreted in a higher-ranking control system as a warning signal, so that suitable measures can be taken in good time before faults can arise in the process system. With the aid of a suitable evaluation of the progress of the setting values the point in time can be determined at which the pipeline must be cleaned or exchanged. The costs associated with an unforeseen system outage are thus avoided. In addition no endoscopic pre-inspections entailing considerable effort, are required. The pressure output by the pump 13 is recorded with the pressure switch 14. With this pressure switch 14 a signal 15 is created indicating that the pressure value has exceeded a permitted deviation from a predetermined average pressure value. Time ranges in which this value is exceeded can be taken from the evaluation of the position values for monitoring the pipeline on reduction of the free internal cross section A. Alternatively it is of course possible to replace the pressure switch 14 by a pressure sensor which delivers process values of the pressure to the evaluation unit 11. In this case the influence of variations of the pump pressure on the monitoring result can be eliminated by the relationship between the position of the valve 2 and pressure of the pump 13 being determined and the influence balanced out by insertion of a suitable compensation element in the evaluation unit 11.

Figure 2:
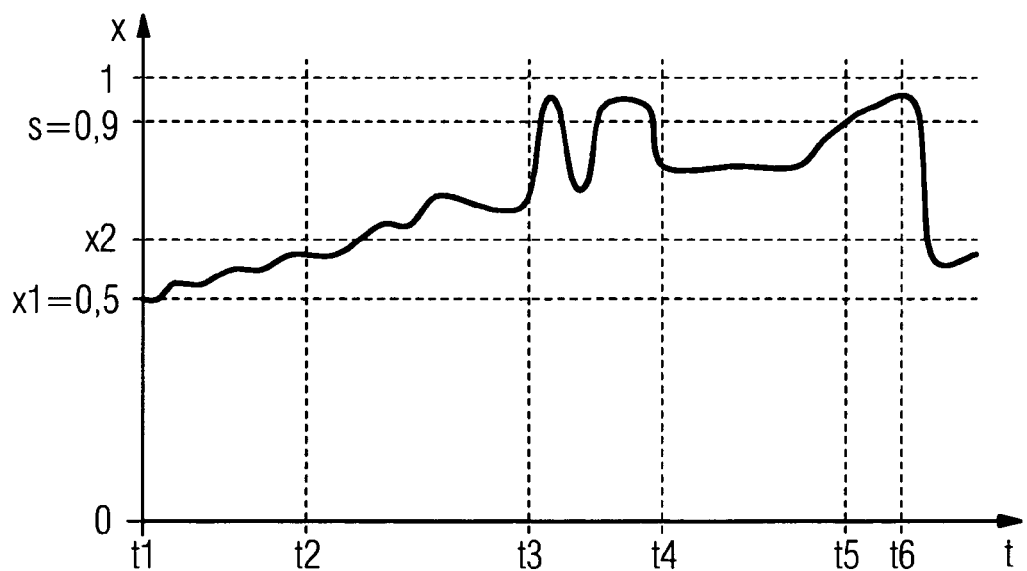
FIG. 2 the basic sequence of the valve setting as the blockage of the pipeline increases.

FIG. 2 shows a graph of the values typical in practice for the position x of a valve with increasing deposits in the pipelines of a process system. The time t is plotted at the abscissa, the position x of a valve at the ordinate with a scaled range of values from 0 to 1. A position x=0 corresponds to a closed valve, a position x=1 to a fully open valve. At a first point in time t1, preferably when the process system is commissioned, a value x1=0.5 of the valve position is recorded and stored. During the later operation of the system further values of the position are measured at regular intervals and stored, so that the curve shown in the diagram is produced. Depending on the value x1=0.5 of the valve position measured on commissioning a threshold value s is calculated, which if exceeded, prompts the assumption that the deposits in the pipelines must be so great that a cleaning or an exchange of the pipeline is required in the next maintenance cycle. In the exemplary embodiment shown the threshold value s is defined at 80% of the remaining setting range available until further opening of the valve. The threshold s is thus set to the value 0.9. Values of the valve setting determined at later times, for example a setting x2 at a second point in time t2, are compared with the threshold value s predetermined in the described manner. An indicator signal generated if the threshold value s is exceeded is interpreted as a requirement for maintenance of the pipeline system. A period between the times t3 and t4, in which increased pressure variations were defined in the monitored pipeline, is hidden in the monitoring of the pipeline for slow reduction of the free internal cross section, since here no simple conclusion can be drawn about the current position of the valve for the blockage of the pipeline. At a point in time t5 the measured value of the valve setting exceeds the threshold values s, so that a corresponding display signal is created here. In the subsequent maintenance cycle at a point in time t6 the blocked pipeline is exchanged. After maintenance has been completed essentially the same flow through the pipeline can again be set with a valve which is much less open.

It can be clearly seen from the graph shown that alternatively or in addition to the evaluation of an actual threshold being exceeded described above, the point in time at which the threshold is expected to be exceeded can be determined on the basis of a trend analysis and output.

The invention claimed is:

1. A method for monitoring a pipeline for slow reduction of an internal cross section of the pipeline by using a position of a control valve in the pipeline, wherein an substantially constant flow of a medium through the control valve exists, the method comprising:
   determining and storing a first position of the control valve at a first point in time;
   determining a second position of the control valve later point in time at a second point in time later than the first point in time;
   determining a time at which the position of the valve exceeds a specifiable threshold value for a valve opening; and
   outputting a signal to indicate the threshold is exceeded and/or to indicate the time the threshold was exceeded.

2. The method in accordance with claim 1, wherein the threshold value is predetermined depending on the first position of the control valve.

3. The method in accordance with claim 1, wherein the threshold value is at 80% opening relative to the range of settings between complete valve opening and the first position of the control valve.

4. The method in accordance with claim 1, wherein the setting signal is smoothed by a low-pass filter before the valve position is determined.

5. The method in accordance with claim 2, wherein the setting signal is smoothed by a low-pass filter before the valve position is determined.

6. The method in accordance with claim 3, wherein the setting signal is smoothed by a low-pass filter before the valve position is determined.

7. The method in accordance with claim 4, wherein the setting signal is smoothed by the low-pass filter by forming a moving average value, before the valve position is determined.

8. The method in accordance with claim 1, wherein the change over time in the position of the control valve is determined and the point is estimated at which the position of the control valve is likely to exceed the specifiable threshold values is estimated.

9. The method in accordance with claim 2, wherein the change over time in the position of the control valve is determined and the point is estimated at which the position of the control valve is likely to exceed the specifiable threshold values is estimated.

10. The method in accordance with claim 3, wherein the change over time in the position of the control valve is determined and the point is estimated at which the position of the control valve is likely to exceed the specifiable threshold values is estimated.

11. The method in accordance with claim 4, wherein the change over time in the position of the control valve is determined and the point is estimated at which the position of the control valve is likely to exceed the specifiable threshold values is estimated.

12. The method in accordance with claim 7, wherein the change over time in the position of the control valve is determined and the point is estimated at which the position of the control valve is likely to exceed the specifiable threshold values is estimated.

13. The method in accordance with claim 1, wherein the pressure of the medium in the pipeline is determined and that, if a permitted deviation from an average pressure value is exceeded the monitoring of the pipeline for reduction of the internal cross section is interrupted.

14. The method in accordance with claim 2, wherein the pressure of the medium in the pipeline is determined and that, if a permitted deviation from an average pressure value is exceeded the monitoring of the pipeline for reduction of the internal cross section is interrupted.

15. The method in accordance with claim 3, wherein the pressure of the medium in the pipeline is determined and that, if a permitted deviation from an average pressure value is exceeded the monitoring of the pipeline for reduction of the internal cross section is interrupted.

16. The method in accordance with claim 4, wherein the pressure of the medium in the pipeline is determined and that, if a permitted deviation from an average pressure value is exceeded the monitoring of the pipeline for reduction of the internal cross section is interrupted.

17. The method in accordance with claim 15, wherein to suppress the influence of pressure variations on the position of the valve, a pressure compensation is executed on the basis of a predefined dependency of the valve position on a pressure of the medium.

18. The method in accordance with claim 2, wherein to suppress the influence of pressure variations on the position of the valve, a pressure compensation is executed on the basis of a predefined dependency of the valve position on a pressure of the medium.

19. The method in accordance with claim 3, wherein to suppress the influence of pressure variations on the position of the valve, a pressure compensation is executed on the basis of a predefined dependency of the valve position on a pressure of the medium.

20. A position regulator for a control valve, comprising:
a position indicator for acquiring a position of the control valve; and
an evaluation device for evaluating the acquired position, wherein the evaluation device is embodied such that when the control valve is used in a control loop to regulate to a constant flow of a medium through a pipeline to monitor the pipeline for slow reduction of a free internal cross section with the aid of a position of the control valve, at a first point in time a first position of the control valve is determined and stored, and wherein at a second, later point in time at least a second position of the control valve is determined, and wherein the time at which the position of the valve exceeds a definable threshold value for valve opening is determined, and wherein a signal to indicate that the threshold has been exceeded and/or the time at which it was exceeded is output.

* * * * *